US007469509B2

(12) United States Patent
Cripe

(10) Patent No.: US 7,469,509 B2
(45) Date of Patent: Dec. 30, 2008

(54) WINDOW ASSEMBLY WITH SERVICEABLE GLAZING RETENTION SYSTEM

(75) Inventor: Todd Ellsworth Cripe, Elkhart, IN (US)

(73) Assignee: Dura Global Technologies, Inc., Rochester Hills, MI (US)

(*) Notice: Subject to any disclaimer, the term of this patent is extended or adjusted under 35 U.S.C. 154(b) by 242 days.

(21) Appl. No.: 11/290,659

(22) Filed: Nov. 29, 2005

(65) Prior Publication Data

US 2007/0130851 A1 Jun. 14, 2007

(51) Int. Cl.
*E06B 3/00* (2006.01)
*B60J 1/10* (2006.01)
*B60J 7/00* (2006.01)

(52) U.S. Cl. ..................... 52/208; 296/201; 296/146.15

(58) Field of Classification Search .................. 52/208, 52/204.55, 204.6, 204.62, 204.63, 204.53, 52/656.5, 656.6; 296/201, 146.15
See application file for complete search history.

(56) References Cited

U.S. PATENT DOCUMENTS 4,561,223 A * 12/1985 Gold et al. .................... 52/202
4,703,973 A * 11/1987 Fujikawa .................... 296/201
4,951,907 A * 8/1990 Gold ....................... 248/205.5
4,986,595 A * 1/1991 Gold .......................... 296/201
5,531,496 A * 7/1996 Zbinden et al. .......... 296/96.21
6,101,772 A * 8/2000 Leonard et al. .......... 52/204.53
6,224,136 B1 * 5/2001 Takagi ..................... 296/96.21
6,364,404 B1 * 4/2002 De Paoli ..................... 296/201
6,378,931 B1 * 4/2002 Kolluri et al. .......... 296/146.15
6,694,683 B2 * 2/2004 Anderson et al. .......... 52/204.5
2001/0030449 A1 * 10/2001 De Paoli ..................... 296/201
2004/0251714 A1 * 12/2004 Hintzke et al. ......... 296/146.15
2007/0063539 A1 * 3/2007 DiMario et al. ........ 296/146.15

FOREIGN PATENT DOCUMENTS

JP 57209421 A * 12/1982
JP 59089214 A * 5/1984
JP 62191217 A * 8/1987
JP 62210120 A * 9/1987
JP 63184520 A * 7/1988

* cited by examiner

*Primary Examiner*—Richard E Chilcot, Jr.
*Assistant Examiner*—Ryan D Kwiecinski
(74) *Attorney, Agent, or Firm*—Richard M. Mescher; Porter, Wright, Morris & Arthur, LLP; Dean B. Watson

(57) ABSTRACT

A window assembly includes a glazing, a frame encircling a periphery of the glazing and securable about an opening in a support structure, and at least one retaining bracket secured to the glazing. The retaining bracket can be secured to the glazing with adhesive or mechanical fasteners. The retaining bracket has at least one tab forming an interlock with the frame to secure the glazing to the frame so that the glazing is selectively removable from the frame without removing the frame from the support structure. Preferably, the retaining bracket extends through an opening in the frame and the tab engages an edge of the opening to form the interlock.

18 Claims, 3 Drawing Sheets

WINDOW ASSEMBLY WITH SERVICEABLE GLAZING RETENTION SYSTEM

CROSS-REFERENCE TO RELASTED APPICATIONS

Not appicable

STATEMENT REGARDING FEDERALLY SPONSORED RESEARCH

Not appicable

REFERENCE TO MICROFICHE APPENDIX

Not appicable

FIELD OF THE INVENTION

The present invention generally relates to window assemblies and, more particularly, to window assemblies for passenger vehicles having glazings serviceable without removing the remainder of the window assemblies.

BACKGROUND OF THE INVENTION

Passenger vehicles such as, for example, busses, recreational vehicles, vans, sport utility vehicles, cross over vehicles, rail cars and the like typically have windows. These windows can be fixed windows wherein glazings cannot be opened, moving windows wherein glazings can be selectively opened by the passengers, and combination windows having both fixed and moving glazings.

The glazings of these window assemblies often become damaged though accidents and vandalism. To service the glazings, the entire window assemblies typically must be removed from the passenger vehicles in order to repair or replace the glazings. As a result, repairing and/or replacing glazings is a relatively time consuming and expensive process.

Additionally, there is a never ending desire in the passenger vehicle industry to reduce cost and weight and improve operational performance. Accordingly, there is a need in the art for an improved window assembly that overcomes some or all of the difficulties in prior known devices.

SUMMARY OF THE INVENTION

The present invention provides a window assembly of a passenger vehicle which overcomes at least some of the above-noted problems of the related art. According to the present invention, a window assembly comprises, in combination, a glazing, a frame encircling a periphery of the glazing and securable about an opening in a support structure, and at least one retaining bracket secured to the glazing. The retaining bracket has at least one tab forming an interlock with the frame to secure the glazing to the frame so that the glazing is selectively removable from the frame without removing the frame from the support structure.

According to another aspect of the present invention, a window assembly for a passenger vehicle comprises, in combination, a glazing, a frame encircling a periphery of the glazing and securable about an opening in the passenger vehicle, and at least one retaining bracket secured to the glazing. The retaining bracket has at least one tab forming an interlock with the frame to secure the glazing to the frame so that the glazing is selectively removable from the frame without removing the frame from the passenger vehicle. The glazing is located on a first side of the frame and the tab is located on a second side of the frame opposite the first side. The retaining bracket extends through an aperture in the frame and engages at least one edge of the aperture to form the interlock.

According to yet another aspect of the present invention, a window assembly for a passenger vehicle comprises, in combination, a glazing, a frame encircling a periphery of the glazing and securable about an opening in the passenger vehicle, and at least one retaining bracket secured to the glazing. The retaining bracket has first and second tabs extending in opposite directions and forming an interlock with the frame to secure the glazing to the frame so that the glazing is selectively removable from the frame without removing the frame from the passenger vehicle. The glazing is located on a first side of the frame and the first and second tabs are located on a second side of the frame opposite the first side and the retaining bracket extends through an aperture in the frame. The first and second tabs engage opposite edges of the aperture to form the interlock.

From the foregoing disclosure and the following more detailed description of various preferred embodiments it will be apparent to those skilled in the art that the present invention provides a significant advance in the technology and art of window assemblies. Particularly significant in this regard is the potential the invention affords for providing a high quality, reliable, low cost window assembly having a glazing that is serviceable without removing the remainder of the window assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
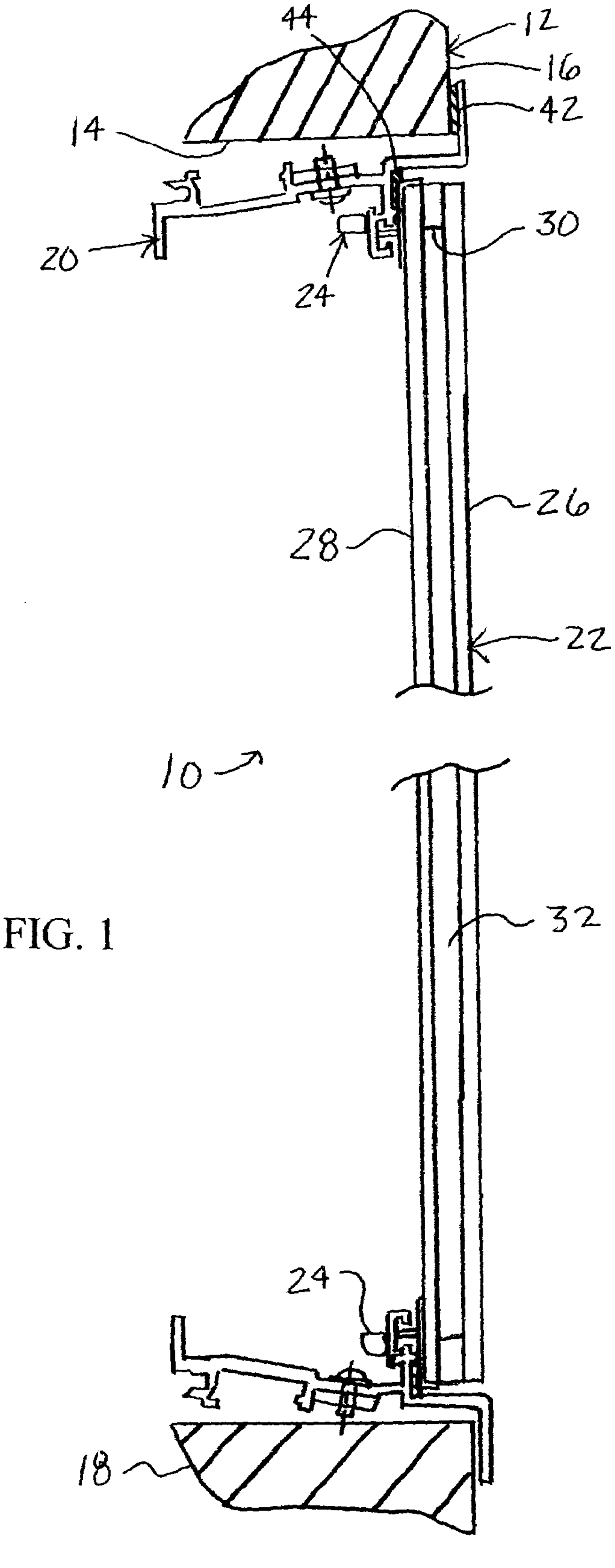
FIG. 1 is a cross-sectional, side elevational view of a window assembly for a passenger vehicle according to a preferred embodiment of the present invention.

It should be understood that the appended drawings are not necessarily to scale, presenting a somewhat simplified representation of various preferred features illustrative of the basic principles of the invention. The specific design features of window assembly for a passenger vehicle as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the window assembly illustrated in the drawings. In general, up or upward generally refers to an upward direction within the plane of the paper in FIG. 1 and down or downward generally refers to a downward direction within the plane of the paper in FIG. 1. In general, foreword or fore generally refers to a direction toward the front of the passenger vehicle and aft, rear or rearward generally refers to a direction toward the rear of the passenger vehicle. Also in general, inward or inner generally refers to a direction toward the inside of the passenger vehicle and outward or outer generally refers to a direction toward the outside of the passenger vehicle.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved window assembly disclosed herein. The following detailed discussion of various alternative and preferred embodiments will illustrate the general principles of the invention with reference to a fixed rectangular-shaped window assembly for a passenger vehicle. Other embodiments suitable for other applications will be apparent to those skilled in the art given the benefit of this disclosure.

The window assembly 10 for a passenger vehicle 12 is typically installed in a window opening 14 of a support structure such as the body of the passenger vehicle 12. The passenger vehicle 12 can be, for example, a bus, a recreational vehicle, a van, a sport utility vehicle, a cross over vehicle, a rail car, and the like. As best shown in FIG. 1, the window opening 14 is typically defined by a header 16, a footer 18 spaced below the header, and a pair of side jambs (not specifically shown) connecting ends of the header and footer 16, 18.

Figure 2:
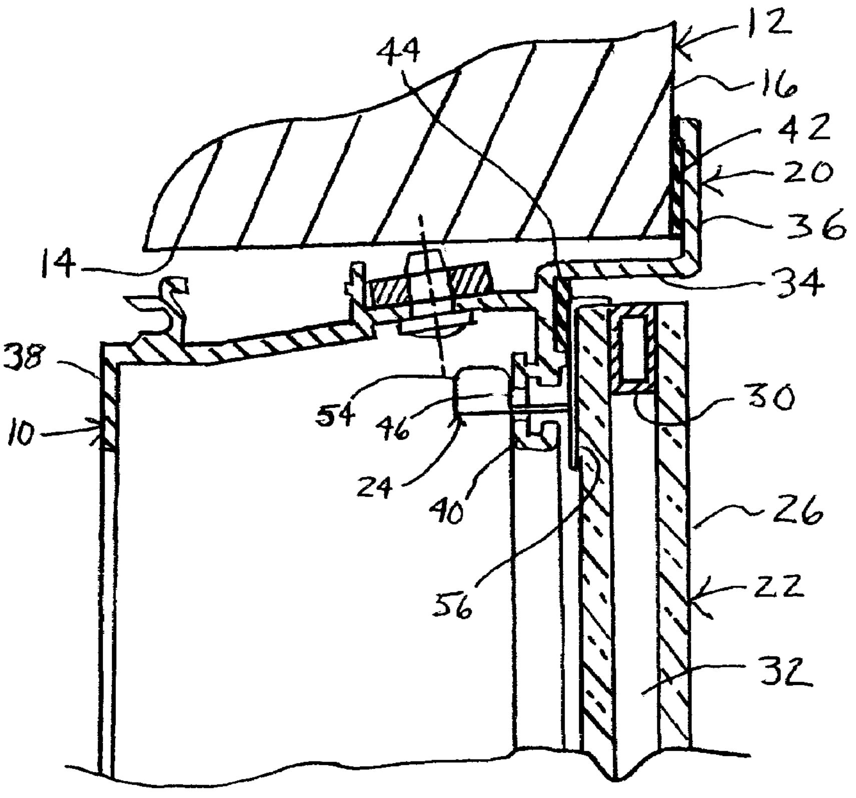
FIG. 2 is an enlarged, fragmented view showing a portion of the window assembly of FIG. 1 at a retention bracket.
Figure 3:
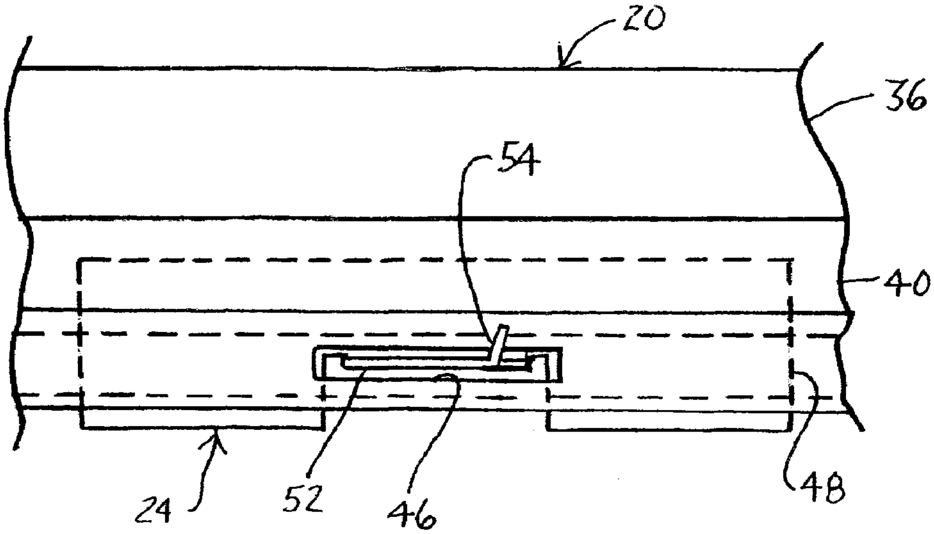
FIG. 3 is an enlarged, fragmented inside elevational view of the window assembly of FIGS. 1 and 2 showing the retention bracket.

FIGS. 1 to 3 illustrate a window assembly 10 for a passenger vehicle 12 according to the present invention. The illustrated window assembly 10 includes a frame 20 extending about a periphery of the window opening 14, a glazing or glazing assembly at least partially closing the frame 20 and the window opening 14, and at least one retention or retaining bracket 24 secured to the gazing assembly and forming a interlock with the frame 20 to secure the glazing assembly 22 to the frame 20 so that the glazing assembly 22 is selectively removable from the frame 20 without removing the frame 20 from the passenger vehicle 12.

The illustrated glazing assembly 22 includes a first or outer glazing pane 26 and a second or inner glazing pane 28 spaced inward of the outer glazing pane 26. A spacer 30 is positioned between the first glazing pane 26 and the second glazing pane 28 about a periphery of the glazing panes 26, 28 to create an insulating space or gap 32 between the glazing panes 26, 28. The insulating gap 32 provides an insulative capability for the glazing assembly 22. The spacer 30 may be formed of aluminum, plastic, or any other suitable material that will become readily apparent to those skilled in the art given the benefit of this disclosure. In certain embodiments, the first glazing pane 26 has a thickness of at least approximately ⅛ inches thick, the second glazing pane 28 has a thickness of at least approximately ⅛ inches thick, and the insulating gap 30 has a thickness of at least approximately 3/16 inches thick. It is noted that while the illustrated glazing assembly 22 is an insulated glazing assembly having two panes 26, 28, the glazing assembly 22 can alternatively have a single pane or more than two panes within the scope of the present invention.

The illustrated frame 20, in cross-section, includes a horizontal portion 34, an outer flange 36 perpendicularly and outwardly extending from an outer edge of the horizontal portion 34, an inner flange 38 perpendicularly and inwardly extending from an inner edge of the horizontal portion 34, and a seat flange 40 perpendicularly and inwardly extending from an intermediate location of the horizontal portion 34 to form an outwardly facing seat for the glazing assembly 22. The outer flange 36 is sized and shaped to engage an outer surface of the header 16. A seal or sealant 42 is positioned between the outer flange 36 and the header 16 to provide a weatherproof seal. The seal 42 is preferably formed of an elastomeric material such as natural or synthetic rubber, ethylene-propylene terploymer (EPDM), vinyl, polyvinyl chloride, thermoplastic elastomer, a closed-cell foam material or the like. Other suitable materials for the seal 42 will become readily apparent to those skilled in the art given the benefit of this disclosure.

The illustrated seat flange 40 is sized and shaped to provide a seat for the glazing assembly 22 wherein an outer surface of the outer glazing 26 is substantially flush with the outer surface of the outer flange 36. It is noted that the frame 20 can alternatively be sized and shaped so that the glazing assembly 22 is not flush mounted. It is also noted that the frame 20 can alternatively be sized and shaped so that it is a hidden frame, that is, the frame 20 is substantially not visible from the outside of the passenger vehicle 12 except through the glazing assembly 22.

The illustrated glazing assembly 22 is seated within the frame 20 against the seat flange 40. A seal or sealant 44 is positioned between the seat flange 40 and the inner glazing pane 28 to provide a weatherproof seal. The seal 44 is preferably formed of an elastomeric material such as natural or synthetic rubber, ethylene-propylene terploymer (EPDM), vinyl, polyvinyl chloride, thermoplastic elastomer, a closed-cell foam material or the like. Other suitable materials for the seal 44 will become readily apparent to those skilled in the art given the benefit of this disclosure.

At least one opening 46 is provided within the seat flange 40 for passage of the retaining bracket 24 therethrough as described in more detail herein below. The illustrated opening 46 is provided below the seal 44, that is, within the sealed interior. The illustrated opening 46 is a closed aperture in the form of a rectangular slot having substantially parallel upper and lower edges. It is noted, however, that the opening 46 can alternatively have any other suitable shape such as for example can be a notch in the lower edge of the seat flange 40.

The illustrated frame 20 is generally rectangular-shaped to closely match the window opening 14 but can be of any other suitable shape depending on the shape of the window opening 14. The frame 20 may be a continuous one piece component or can be several components secured together. The frame 20 may be formed of aluminum, stainless steel, plastic, or the like. Other suitable materials for the frame 20 will become readily apparent to those skilled in the art given the benefit of this disclosure.

Figure 4:
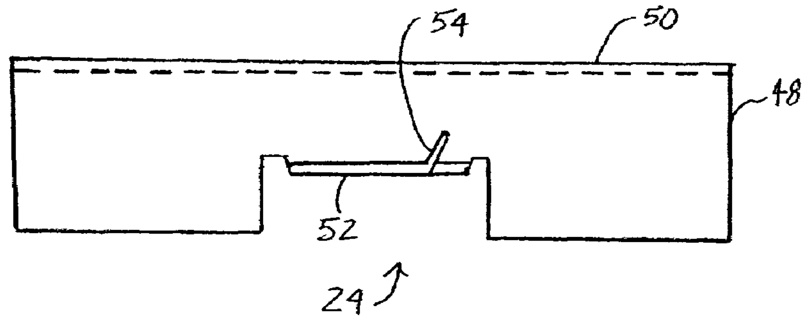
FIG. 4 is an inside elevational view of the retention bracket of the window assembly of FIGS. 1 to 3.
Figure 5:
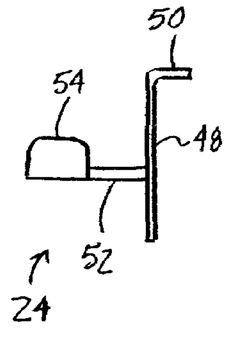
FIG. 5 is a side elevational view of the retention bracket of FIG. 4.

As best shown in FIGS. 4 and 5, the illustrated retaining bracket 24 includes a vertical portion 48, a flange 50 perpendicularly and outwardly extending from an edge of the vertical portion 48, a horizontal portion 52 perpendicularly and inwardly extending from an intermediate location of the vertical portion 48, and a tab 54 extending from the horizontal portion 52. The flange 50 is sized and shaped to extend along the top edge of the inner glazing pane 28. The vertical portion 48 is sized and shaped to extend along the inner surface of the inner glazing pane 28. The horizontal portion 52 is sized and shaped to extend through the opening 46 in the frame 20 to position the tab 54 at the inner side of the seat flange 40 of the frame 20. The tab 54 is sized and shaped to form the interlock with the seat flange 40 as described in more detail hereinafter. The illustrated retaining bracket 24 is a unitary, one-piece component formed by bending sheet metal. It is noted, however, other suitable materials for the retaining bracket 24 will become readily apparent to those skilled in the art given the benefit of this disclosure.

The illustrated retaining bracket 24 is secured to the glazing assembly 22 with adhesive 56 but can alternatively be secured in other manner such as mechanical fasteners or the like. Other suitable connections for the retaining bracket 24 will become readily apparent to those skilled in the art given the benefit of this disclosure. With the retaining bracket 24 secured to the glazing assembly 22, the retaining bracket 24 extends through the frame opening 46 so that the tab 54 is positioned on the opposite side of the seat flange 40 to form an interlock with the seat flange 40 to retain the glazing assembly 22 to the frame 20. The illustrated tab 54 engages the upper edge (as viewed in FIGS. 2 and 3) of the opening 46 to form the interlock.

The illustrated window assembly 10 is provided with one of the retaining brackets 24 at each side of the glazing assembly 22. It is noted, however, that a greater or lesser number of retaining brackets 24 can be utilized within the scope of the present invention. For example, there can be more than one retaining bracket 24 on a side and/or there can be retaining brackets 24 on less than all of the sides.

In operation, when the glazing assembly needs serviced, the tabs 54 are bent and/or removed so that the inner portions of the retaining brackets 24 can be removed through the openings 46 to remove the glazing assembly 22 from the frame 20 without removing the frame 20 from the passenger vehicle 12. Once the glazing assembly 22 is repaired or replaced, the inner portions of the retaining brackets 24 are inserted through the openings 46 and the tabs 54 are bent to form the interlock with the seat flange 40 to secure the glazing assembly 22 to the frame 20.

Figure 6:
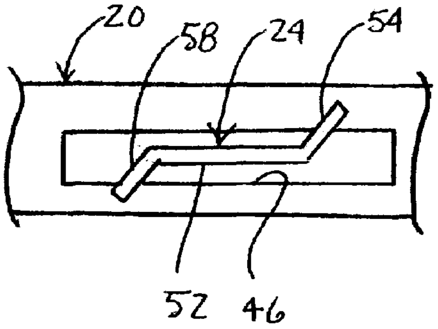
FIG. 6 is an enlarged, fragmented inside elevational view similar to FIG. 3 but showing an alternative retention bracket.

FIG. 6 illustrates that the retaining bracket 24 can alternatively have other configurations. The alternative retaining bracket 24 shows that there can be more than one of the tabs 54. The illustrated retaining bracket 24 has first and second tabs 54, 58 extending from opposite sides of the horizontal portion 52 and in opposite directions. Configured in this manner, the tabs 54, 58 engage opposite edges of the opening 46 to form the interlock.

Figure 7:
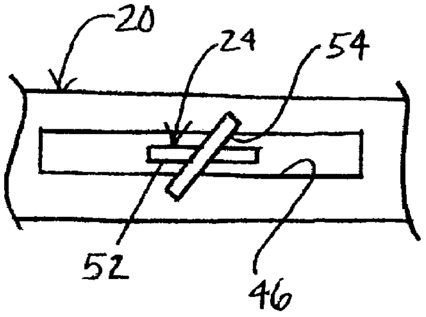
FIG. 7 is an enlarged, fragmented inside elevational view similar to FIGS. 3 and 6 but showing another alternative retention bracket.

FIG. 7 further illustrates that the retaining bracket 24 can alternatively have other configurations. The alternative retaining bracket 24 shows that the tab 54 can extend in more than one direction. The illustrated retaining bracket 24 has a single tab 54 that extends in opposite directions from the horizontal portion 52. Configured in this manner, the tab 54 engages opposite edges of the opening 46 to form the interlock.

It is apparent from the above detailed description of the present invention, that the illustrated window assembly 10 provides a serviceable glazing assembly 22 that can be repaired and/or replaced without removing the frame 20 from the passenger vehicle 12.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A window assembly comprising, in combination:

a glazing;

a frame encircling a periphery of the glazing and securable about an opening in a support structure;

at least one retaining bracket secured to the glazing;

wherein the retaining bracket has at least one tab forming an interlock with the frame to secure the glazing to the frame so that the glazing is selectively removable from the frame without removing the frame from the support structure;

wherein the retaining bracket extends through an opening in the frame with the glazing located on a first side of the frame and the tab located on a second side of the frame opposite the first side;

wherein the retaining bracket is formed of sheet metal and the tab is a bent tab;

wherein the retaining bracket includes a vertical portion secured to the glazing, a flange perpendicularly extending from the vertical portion at an edge of the glazing, and a horizontal portion perpendicularly extending from the vertical portion and through the opening in the frame;

wherein the tab extends from the horizontal portion with a bend perpendicular to the face of the glazing; and wherein the tab is sized and shaped to pass through the opening in the frame in either direction prior to being bent to form the interlock with the frame and to prevent passage through the opening in the frame in either direction after being bent to form the interlock with the frame so that the tab is passed through the opening in the frame and then plastically bent to form the interlock with the frame to secure the glazing to the frame.

2. The window assembly according to claim 1, wherein the glazing includes a first glazing pane and a second glazing pane spaced apart from the first glazing pane by a seal to form an insulating space therebetween.

3. The window assembly according to claim 1, wherein the retaining bracket is secured to the glazing with adhesive.

4. The window assembly according to claim 1, wherein the tab engages an edge of the opening in the frame to form the interlock.

5. The window assembly according to claim 1, wherein the opening in the frame is an aperture and the tab engages opposite edges of the opening in the frame to form the interlock.

6. The window assembly according to claim 1, wherein the opening in the frame is an aperture, the retaining bracket has another tab, and the tab and the another tab engage opposite edges of the opening in the frame to form the interlock.

7. The window assembly according to claim 1, wherein the tab engages an edge of the frame to form the interlock.

8. The window assembly according to claim 1, wherein the tab engages opposite edges of the frame to form the interlock.

9. The window assembly according to claim 1, wherein the retaining bracket has another tab and the tab and the another tab engage opposite edges of the frame to form the interlock.

10. The window assembly according to claim 1, wherein the retaining bracket is a unitary one piece component.

11. A window assembly for a passenger vehicle comprising, in combination:

a glazing;

a frame encircling a periphery of the glazing and securable about an opening in the passenger vehicle;

at least one retaining bracket secured to the glazing;

wherein the retaining bracket has at least one tab forming an interlock with the frame to secure the glazing to the frame so that the glazing is selectively removable from the frame without removing the frame from the passenger vehicle;

wherein the glazing is located on a first side of the frame and the tab is located on a second side of the frame opposite the first side;

wherein the retaining bracket extends through an aperture in the frame and engages at least one edge of the aperture to form the interlock;

wherein the retaining bracket is formed of sheet metal and the tab is a bent tab;

wherein the retaining bracket includes a vertical portion secured to the glazing, a flange perpendicularly extending from the vertical portion at an edge of the glazing, and a horizontal portion perpendicularly extending from the vertical portion and through the opening in the frame;

wherein the tab extends from the horizontal portion with a bend perpendicular to the face of the glazing; and wherein the tab is sized and shaped to pass through the aperture in either direction prior to being bent to form the interlock with the frame and to prevent passage through the aperture in the frame in either direction after being bent to form the interlock with the frame so that the tab is passed through the aperture in the frame and then plastically bent to form the interlock with the frame to secure the glazing to the frame.

12. The window assembly according to claim 11, wherein the glazing includes a first glazing pane and a second glazing pane spaced apart from the first glazing pane by a seal to form an insulating space therebetween.

13. The window assembly according to claim 11, wherein the retaining bracket is secured to the glazing with adhesive.

14. The window assembly according to claim 11, wherein the tab engages opposite edges of the aperture to form the interlock.

15. The window assembly according to claim 11, wherein the retaining bracket is a unitary one piece component.

16. A window assembly for a passenger vehicle comprising, in combination:

a glazing;

a frame encircling a periphery of the glazing and securable about an opening in the passenger vehicle;

at least one retaining bracket secured to the glazing;

wherein the retaining bracket has first and second tabs extending in opposite directions and forming an interlock with the frame to secure the glazing to the frame so that the glazing is selectively removable from the frame without removing the frame from the passenger vehicle;

wherein the glazing is located on a first side of the frame and the first and second tabs are located on a second side of the frame opposite the first side and the retaining bracket extends through an aperture in the frame;

wherein the first and second tabs engage opposite edges of the aperture to form the interlock;

wherein the retaining bracket is formed of sheet metal and the first and second tabs are bent tabs;

wherein the retaining bracket includes a vertical portion secured to the glazing, a flange perpendicularly extending from the vertical portion at an edge of the glazing, and a horizontal portion perpendicularly extending from the vertical portion and through the opening in the frame;

wherein the first and second tabs extend from the horizontal portion with bends perpendicular to the face of the glazing; and wherein the first and second tabs are each sized and shaped to pass through the aperture in either direction prior to being bent to form the interlock with the frame and to prevent passage through the aperture in the frame in either direction after being bent to form the interlock with the frame so that the first and second tabs are passed through the aperture in the frame and then plastically bent to form the interlock with the frame to secure the glazing to the frame.

17. The window assembly according to claim 16, wherein the glazing includes a first glazing pane and a second glazing pane spaced apart from the first glazing pane by a seal to form an insulating space therebetween.

18. The window assembly according to claim 16, wherein the retaining bracket is a unitary one piece component.

* * * * *